United States Patent
Agiwal

(10) Patent No.: US 7,555,716 B2
(45) Date of Patent: Jun. 30, 2009

(54) TERMINOLOGY CUSTOMIZATION IN A PROCESSING ENVIRONMENT

(75) Inventor: Uttam Agiwal, Jamshedpur (IN)

(73) Assignee: SAP AG, Walldorf (DE)

( * ) Notice: Subject to any disclaimer, the term of this patent is extended or adjusted under 35 U.S.C. 154(b) by 602 days.

(21) Appl. No.: 11/191,866

(22) Filed: Jul. 27, 2005

(65) Prior Publication Data

US 2007/0027914 A1 Feb. 1, 2007

(51) Int. Cl.
*G06N 3/00* (2006.01)
(52) U.S. Cl. ..................................... 715/264
(58) Field of Classification Search ................. 715/234, 715/243, 254, 255, 245; 717/137
See application file for complete search history.

(56) References Cited

U.S. PATENT DOCUMENTS

2005/0289506 A1* 12/2005 Renner ....................... 717/105
2005/0289520 A1* 12/2005 Overall ....................... 717/137

* cited by examiner

*Primary Examiner*—Stephen S Hong
*Assistant Examiner*—Kyle R Stork
(74) *Attorney, Agent, or Firm*—Kenyon & Kenyon LLP

(57) ABSTRACT

A processing device receives programming instructions, which may be executable programming code. The processing device, which is within a processing environment, accesses an access table to retrieve the corresponding programming instructions associated with the programming terms in the code. If the instruction, which refers to a particular programming term, is not within the access table, the search is continued within a terms database that includes the user-defined terms. If the term is found within the terms database, that indicates that the programming term is a user-defined term. The corresponding mapped functionality or operation is retrieved and provided to the processing device. The processing device thereupon executes the corresponding program instructions based on the operation mapped from the native term even though the incoming code includes user-defined terms.

21 Claims, 4 Drawing Sheets

130

TERMINOLOGY CUSTOMIZATION IN A PROCESSING ENVIRONMENT

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to program execution in a processing environment and more specifically to terminology and nomenclature of processing elements within the processing environment.

In many processing environments, such as a software platform, there are predefined terms for existing programming elements. Many predefined routines include naming features that are defined by the entity that created the software environment. For example, a data structure may include a defined name, a process routine may have a pre-defined nomenclature and objects, such as tables of data may be designated by programmer-specific terms.

Often times, these terms have specific meaning or are applicable to the creating entity. In other cases, these terms are arbitrarily generated without any specific structure or intuitive nature. One major problem with this technique is that these terms may not be as intuitive or applicative to other parties using the processing environment. For example, another entity using the processing environment for customized software development may experience problems associated with using these predefined terms. Another concern may arise based on the diversity of the background of different programmers using the processing environment. For example, terms may be based on German terms and intuitive to German programmers, but may not be as intuitive for Indian programmers or even English-speaking programmers. Similarly, English terms may be confusing or non-intuitive to non-English speaking users and so on.

When these predefined terms are non-intuitive, this can be problematic for the end user. In one example, a user may have to continually reference a personal look-up table or sheet of notes for clarity on terms. Some users may be required to learn and/or memorize a large collection of these personalized terms, which may be on top of the requisite learned knowledge for the specific programming environment itself. Others problems may exist if a user mistakenly uses inappropriate terms during programming as this can increase time required for debugging programs or routines due to potential confusion over the native terminology. In general, predefined terms that are non-intuitive to the user complicates the usage of the software environment and is generally inefficient for all users outside of the original software developers.

DETAILED DESCRIPTION

The substitution of user-defined terms in place of native terms for programming terms simplifies user operations in a processing environment. The terms, either user-defined or native, refer to programming terms included within programming instructions or coded operations in the processing environment. Through the mapping of subsequent operations of native terms to the user-defined terms, an end user may utilize user-defined terms and the processing environment uses the subsequent native terms. Through the mapping of user-defined term to the native term, the user may then substitute user-defined terminology prior to execution without adversely affecting the operations of the processing environment. For example, if a user is writing software routines or debugging existing routines, usage of the user-defined terms simplifies the process for the end user. The users may more quickly program and/or more effectively use the processing environment when dealing with code having their own user-defined terminology. The processing environment may also utilize any suitable collection of native terms without creating end-user confusion dealing with the programming instructions as the user can deal directly with their own user-defined terms.

Generally speaking, a processing device receives programming instructions, which may be executable programming code. The processing device, which is within a processing environment, accesses an access table to retrieve the corresponding programming instructions associated with the programming terms in the code. If the instruction, which refers to a particular programming term, is not within the access table, the search is continued within a terms database that includes the user-defined terms. If the term is found within the terms database, that indicates that the programming term is a user-defined term. The corresponding mapped functionality or operation is retrieved and provided to the processing device. From the perspective of the processing device, the proper operation is retrieved from a data dictionary having the access table and terms database stored therein. As such, the processing device is not concerned with the programming term being native or user-defined because the same resultant operation is retrieved.

Using user-defined terms in place of predefined terms in the processing environment improves the system's usability. In one embodiment, the user is allowed to generate a list of user-defined terms. From the user's perspective, the processing environment seamlessly operates using both user-defined terms and original terms. It is at run-time that the switch is performed because the term table equates the user-defined term with the original term.

Figure 1:
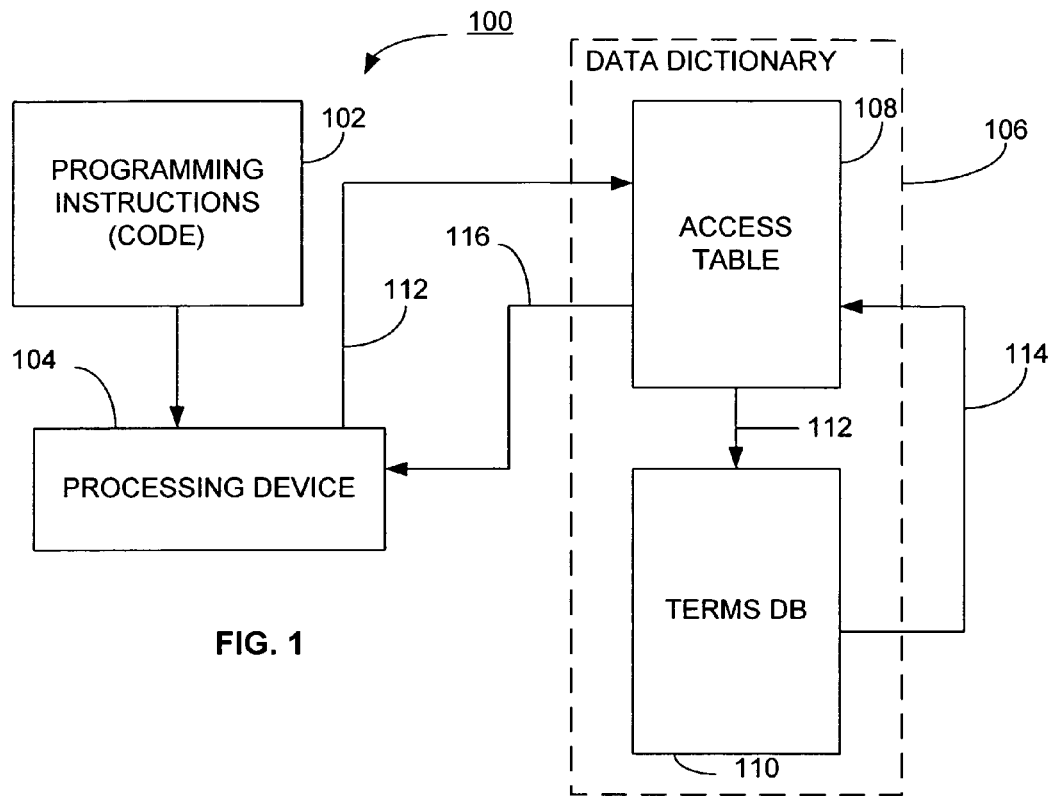
FIG. 1 illustrates a block diagram of one embodiment of an apparatus for customizing terminology in a processing environment.

FIG. 1 illustrates one embodiment of an apparatus 100 providing for the customization of a processing environment. The apparatus 100 includes a block of programming instructions 102, such as executable code. The apparatus 100 further includes a processing device 104 and a data dictionary 106 that includes an access table 108 and a terms database 110.

The programming instructions 102 may be stored in a memory structure awaiting execution. For example, in one embodiment, these instructions may be a called operation that when accessed by a processing element is retrieved from an accessible memory location. In another embodiment, the programming instructions 102 may include or be ancillary to larger instructions, such as complete programming routine or a programming sub-routine for use with a customized application. In a typical embodiment, the programming instructions 102 are generated by an end user to create a customized operation or routine within the processing environment, as executed by the processing device 104.

The instructions 102 are received by the processing device 104, which may one or more processing devices reading the incoming programming instructions 102 and performing corresponding processing operations. As the processing device 104 reads the programming instructions 102, the processing device 104 references the data dictionary 106 for specific processing elements 112. These processing elements 112 may be any suitable encoded command, such as but not limited to a transaction code or object element. In one embodiment, the processing element 112 is a system-understandable encoding providing for a corresponding function. For example, if the element 112 is a transaction code, the call function may be associated with performing a particular operation referenced by the transaction code and if the element 112 is a data object, the call function may retrieve, access, reference or perform any other function associated with the corresponding data object. When the element 112 is a user-defined term, the call command may be a customized call command associated with the processing environment. For example, if the processing environment is the R/3 system or NetWeaver system available from SAP, the customization call command may be an SPRO command.

In one embodiment, the access table 108 is accessed in a look-up fashion. If a programming term 112 is not found in the native command database 108, the search proceeds to the terms database 110.

In the event the programming term 112 is a native term, the corresponding reference command or operation is found within the access table 108 and the terms database 110 is not accessed. Therefore, when using the native terms in the programming instructions 102, the terms database 110 is not utilized.

When a user-defined term is utilized, the terms database 110, as discussed in further detail below, provides for mapping the operation of the functionality of the native term to the user-defined term. As the terms database 110 is accessed, the functionality associated with the native term is mapped to the user-defined term. Based on this mapping technique, the programming instructions may then be executed as if the native term was used in the programming instructions instead of the user defined term. As illustrated in FIG. 1, a mapping indicator 114 provides direction to the access table 108 and more specifically the corresponding native term within the table 108. Therefore, the access table 108 is accessed now using the native term from the term database 110 instead of the programming term 112. As the native term is stored in the access table 108, the native term 116 is provided to the processing device 104.

Thereupon, the processing device 104 may generate executable instructions 118 for the processing environment using the native term 116. These executable instructions 118 may be executed by the processing device 104 or may be provided to other processing elements within a corresponding processing environment. For example, in a multiple processor environment, some instructions 118 may be executed by a remote processing device and some may be performed by local processing devices, such as the processing device 104.

Figure 2:
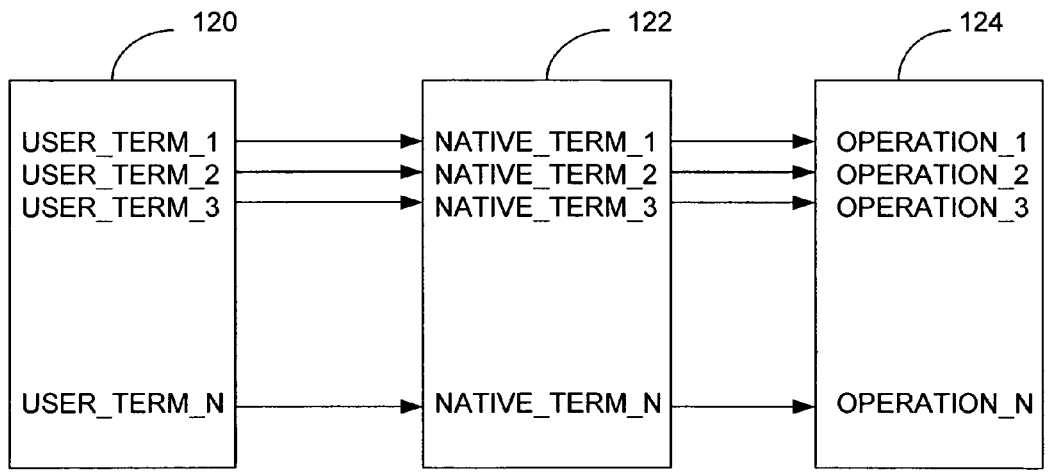
FIG. 2 illustrates a graphical representation of the operations within the data dictionary of FIG. 1.

FIG. 2 illustrates a graphical representation of the mapping of user terms 120 to native terms 122 and subsequently to operational commands 124. The blocks of FIG. 2 may be found within the data dictionary 106 of FIG. 1. The blocks 120, 122 and 124 represent partitioned data, but may be stored in any suitable fashion by the data dictionary (106 of FIG. 1), as recognized by one having ordinary skill in the art.

For each of the user-defined terms 120, each term is mapped to a particular native term 122. For example, user_term__1 is mapped to native_term__1. Therefore, when the processing device (104 of FIG. 1) accesses the data dictionary (106 of FIG. 1) using the user_term__1, the processing device is eventually directed to the corresponding native_term__1. Similarly, the operation of the access table 108 thereupon operates according to known techniques by subsequently providing the corresponding operation 124, such as operation__1 associated with native_term__1.

As visible in the illustration of FIG. 2, the compartmentalized distinction between the user terms 120, the native terms 122 and the operations 124 allow for a high degree of flexibility. For example, if the processing environment, which may define the native terms 122 and the corresponding operations 124, is updated, the operations 124 may be updated. The mapping of the native term 122 to the operation may remain intact, reducing overhead associated with updating the underlying processing environment.

Similarly, if the native terms 122 are updated, this does not necessarily adversely affect the user terms 120. If the native terms 122 are unchanged, but may be the associated functionality is modified, the relationship between the user term 120 and the native term 122 may remain unchanged.

In yet another scenario, varying degrees of user terms 120 may be modified without adjusting or causing revisions to the underlying native terms 122 or the operations 124. For example, different users may have individual sets of user terms 120, such that each user may have their own terms database (110 of FIG. 1) for individualized operation. For example, in one global processing environment, user terms 120 may be set based on the location and resident language of users and programmers. Therefore, different user terms 120 may be established based on the location of the processing device (104 of FIG. 1). The association of the user terms 120 with corresponding native terms 122 allows for individualized adjustments and modifications of user terms 120 without affecting the native terms 122 or the operations 124.

Figure 3:
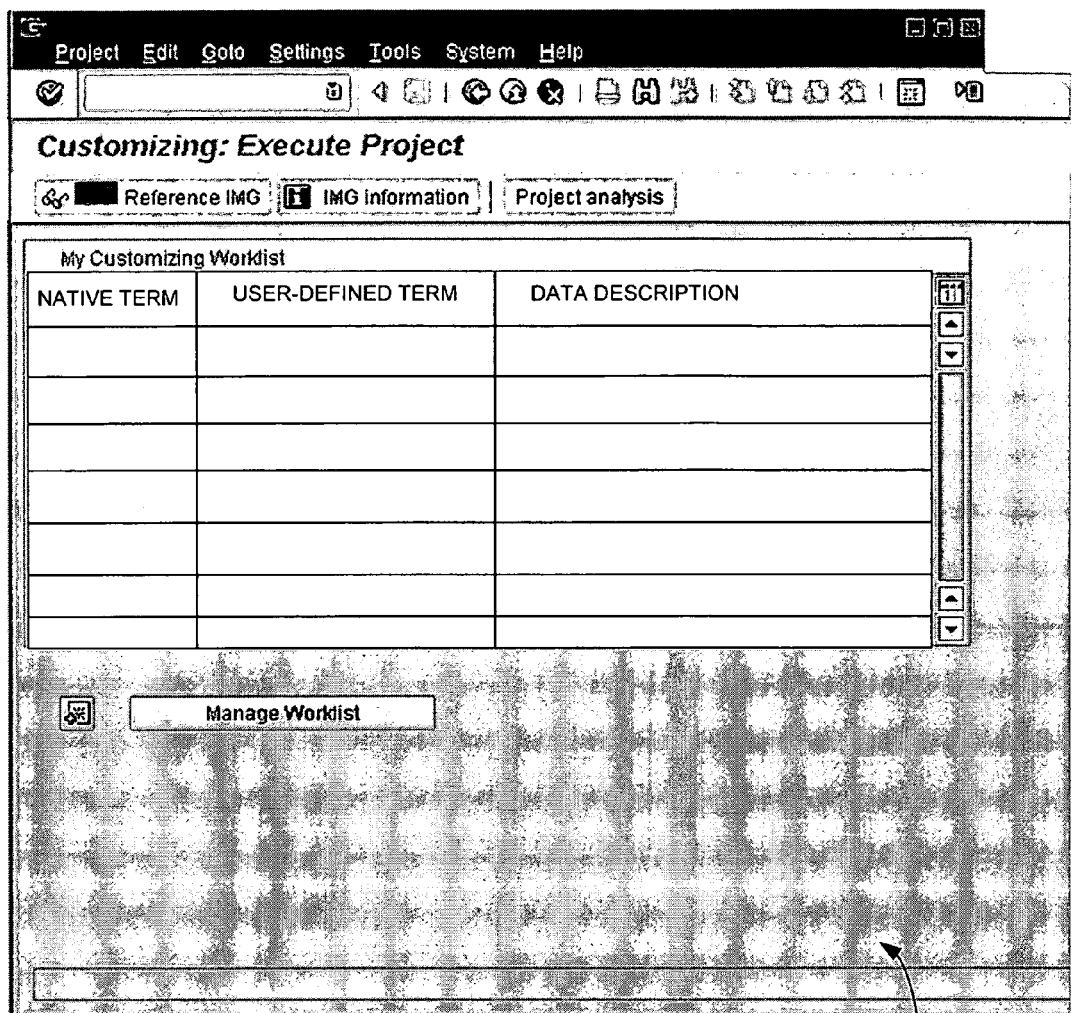
FIG. 3 illustrates a screenshot of one embodiment of a customization input technique.

FIG. 3 illustrates a screen shot 130 of an input screen allowing for customization of terminology. The screenshot 130 represents one representative example of a technique for populating a terms database 110 with user-defined terms and reference to native terms. In one embodiment, the user references an existing term, such as an existing transaction code or object. For example, a transaction code may be "MM03" which is a transaction code for the display of material. In another example, the term may be an object, such as a table name EKPO relating to a purchasing document item. A third column provides for a data description field, describing the transaction or object.

The user may then enter a corresponding user-defined term which relates to the native term. In one embodiment, the user may also put in a data description or alternatively, the description may be inserted based on the native term itself.

Figure 4:
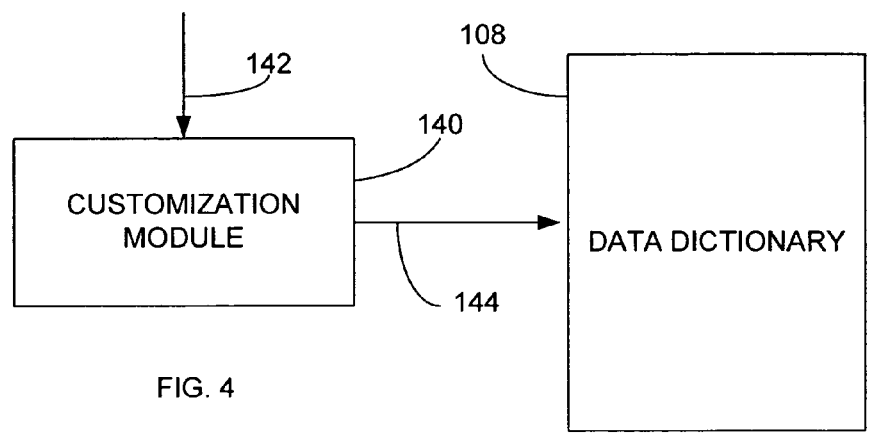
FIG. 4 illustrates a block diagram of one embodiment providing for populating the data dictionary with user-defined terms.

FIG. 4 illustrates a graphical representation of one embodiment of a customization module 140 receiving user input 142. In one embodiment, the user input 142 may be an encoded description or identification of input provided for corresponding native terms and user-defined terms. The customization module 140, which may executable instructions operating on one or more processing devices, receives the user input 142 and processes the data. Based on user input 142, corresponding customized terminology data 144 is provided to the data dictionary 106. As the data dictionary 106 includes the access table (not specifically identified in FIG. 4) and the access table includes the mapping functionality between the native term and the operation, the customized terminology data 144 provides for a mapping of the user-defined term to the native term.

Figure 5:
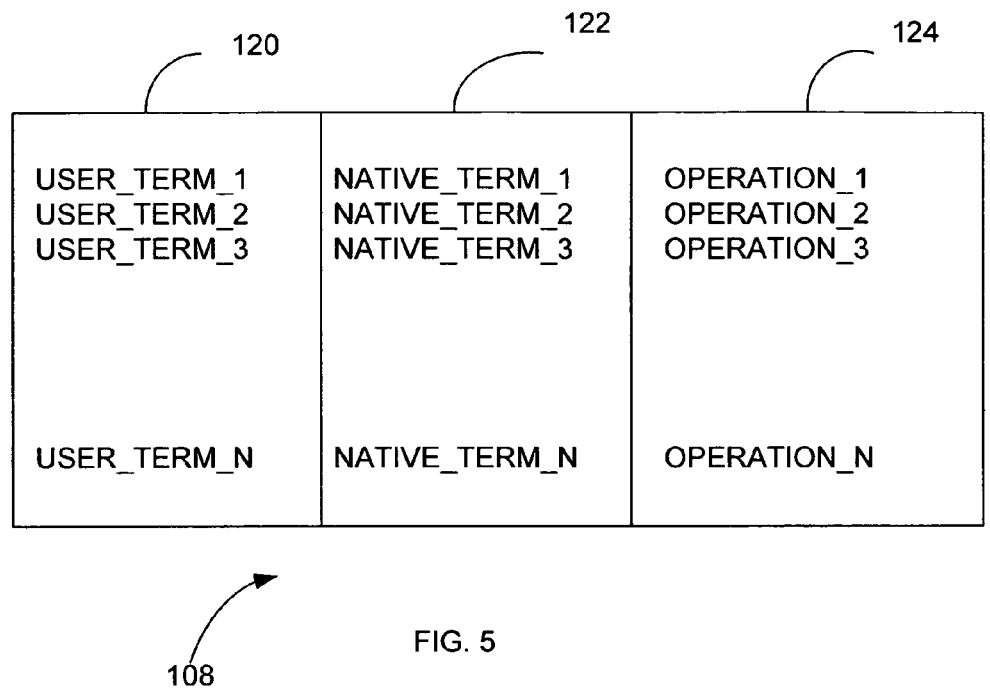
FIG. 5 illustrates a graphical representation of one embodiment of data dictionary.

FIG. 5 illustrates a graphical representation of the data dictionary 108 including the term fields, 120, 122 and 124, similar to the fields illustrated in FIG. 2. These fields graphically represent the partitioned components of the data dictionary 108, where fields 120 are designated as being stored in the terms database (110 of FIG. 1) and the fields 122 and 124 are stored in the access table (108 of FIG. 1). The processing environment is defined with the fields 122 and 124, wherein the customization module 140 of FIG. 4 provides the population of the user-defined terms 120 based on the user input 142.

In one embodiment, as the native terms 122 are already mapped to corresponding operations 124, mapping the user terms 120 to the native terms 122 therein provides for mapping the user terms 120 to the corresponding operations. Using the exemplary operations listed above, transaction code MM03 and object EKPO, these terms might be customized by associating native term, transaction code, MM03 with the user-defined term of "material_display" and the native term, object, EKPO with the user-defined term "P_O_table." In this example, "material_display" is written to the user-defined terms 120 and mapped to the native term "MM03." Similarly, the user-defined term "P_O_table" is written to the terms database and mapped to "EKPO."

Referring back to FIG. 4, the customization module 140 provides the customized terminology data 144 to populate the user term portion 120 of the data dictionary 106, and more specifically in one embodiment, in the terms database 110, as illustrated in FIG. 1. The customization module 140 allows for the population of the user terms 120 and the inclusion of mapping functionality to the corresponding native term 122. Therefore, the contents of the native terms 122, stored in the access table, is not affected or altered. Instead, the user terms 120 may function on top of the existing native terms 122 stored in the access table in the data dictionary.

Figure 6:
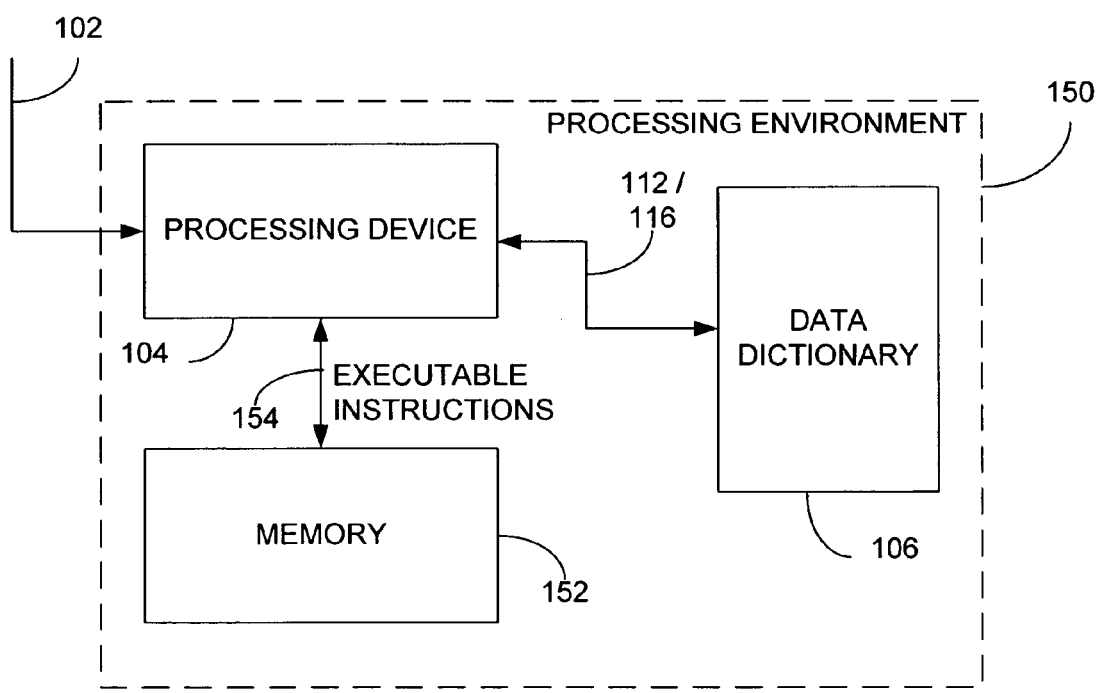
FIG. 6 illustrates a block diagram of a processing environment that is operative to provide for customizing terminology.

FIG. 6 illustrates a processing environment 150 including the executable instructions providing for customization of terminology. The processing environment 150 generally includes the processing device 104 which executes a defined operating system or platform providing for system specific operations. The processing device is coupled to a memory device 152 and receives executable instructions 154 therefrom. The executable instructions 154 provide for the specific operation of the processing device, including operations relating to the underlying platform or operating environment. For example, an exemplary environment may be a software platform allowing for multi-level database access across one or more networks. the processing device 104, which may be one of many processing devices, executes instructions, in accordance with known techniques for providing this functionality.

In the processing environment 150, the processing device 104 is further coupled to the data dictionary 106 which includes the access table (108 of FIG. 1) and the terms database (110 of FIG. 1). Through providing processing elements 112, which include user-defined terms to the data dictionary, and the receipt of native terms 116 and the operational function therefrom, the processing device 104, in response to executable instructions 154 allows for the customization of terminology as described herein.

Figure 7:
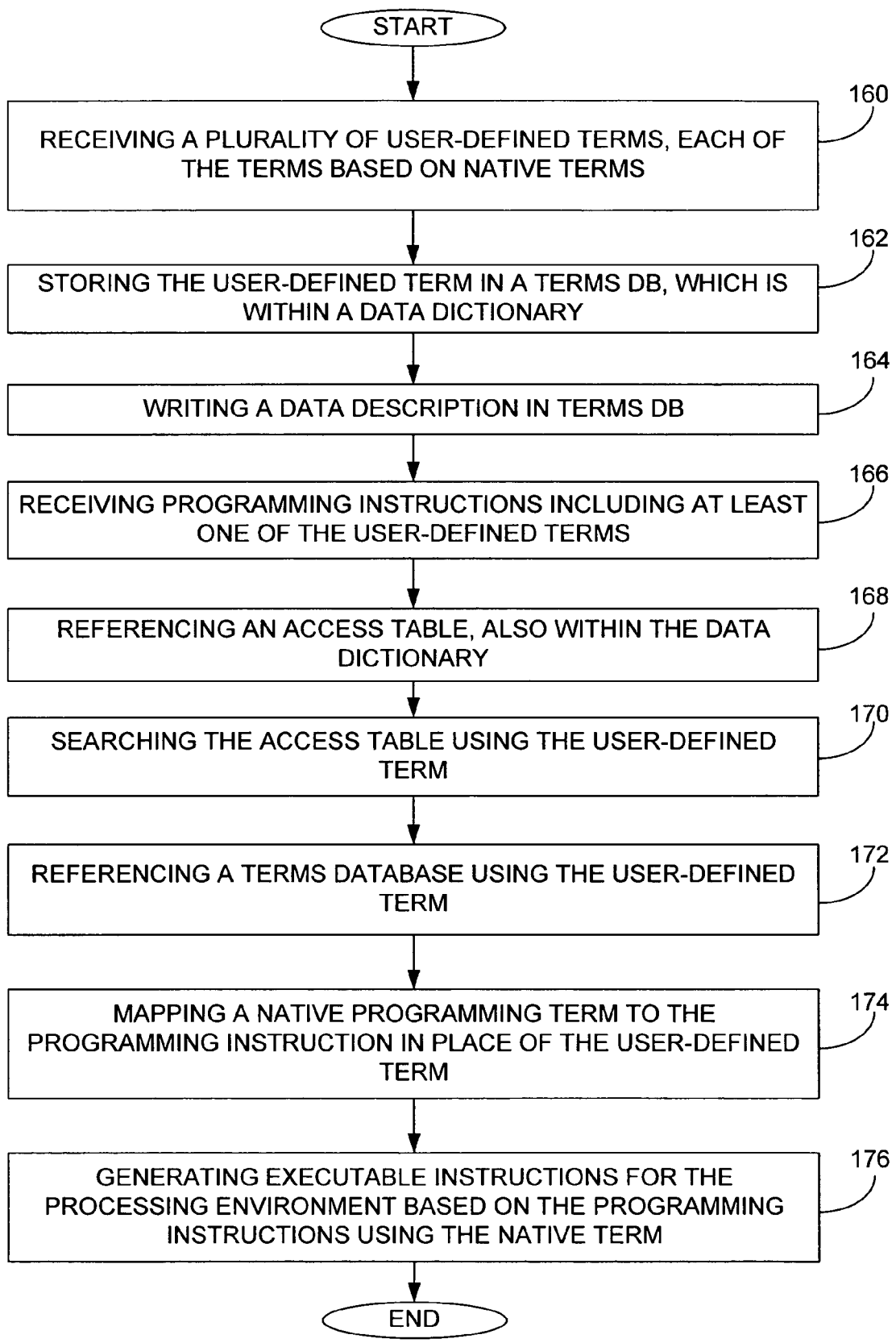
FIG. 7 illustrates the steps of one embodiment of a method for customizing terminology in a processing environment.

FIG. 7 illustrates the steps of one embodiment of a method for customizing terminology in a processing environment. The method begins, step 160, by receiving a plurality of user-defined programming terms, where each of the programming terms is based on a native terms. These user-defined terms may be received via user input 142 into a customization module 140, as illustrated in FIG. 4.

The next step in one embodiment is storing the user-defined term in a terms database within a data dictionary, step 162. For example, as illustrated in FIG. 1, the terms database 110 may be within the data dictionary 106. The next step, step 164, may be writing a data description in the terms database. This data description may be inputted by an end user to provide clarification as the user-defined term and in another embodiment, the data description may be included based on the description of the referring native term.

In one embodiment, the next step, step 166, is receiving programming instructions including at least one of the user-defined terms. These programming instructions 120 may be received by the processing device 104. The processing device may thereupon reference an access table, also within the data dictionary, step 168. As illustrated in FIG. 1, the processing element 112 is provides to the access table 108 to determine if the processing element is a native term. Thus, the access table is searched using the user-defined term, step 170, as in this embodiment, the processing element is a user-defined term.

Once the user-defined term is not found in the access table, the next step, step 172, is referencing a terms database using the user-defined term. The terms database 110 is accessed with the processing element 112 of FIG. 1. Once the user-defined term is found within the terms database 110, the next step 174 is mapping a native programming term to the programming instruction in place of the user-defined term. This native term is then used to reference a corresponding operation, which is provided to the processing device 104 of FIG. 1.

The next step, step 176, is generating executable instructions for the processing environment based on the programming instructions using the native term. Therefore, the processing device received programming instructions 102 that included user-defined terms. The processing device does not have any knowledge or indication if the instructions refer to predefined or native terminology or if the instructions include user-defined terms generated for the customization of the processing environment. The processing device follows normal operations of accessing the access table 108 in the data dictionary 106 and subsequently receives the appropriate operation therefrom. Seamless to the processing device, the user-defined term is provided to the terms database, whereupon the operation associated with the user-defined term is retrieved based on mapping the user-defined term to the appropriate native term. As such, customized terminology is provided in a processing environment.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for customizing terminology in a processing environment, the apparatus comprising:
   an access table storing a plurality of native terms in a default language with at least one of the native terms containing a reserved word in the form of a command in the default language representing a program instruction that is to be executed when the command is processed by a processor;
   a terms data structure storing a plurality of user-defined terms in at least one language other than the default language, associating each of the user-defined terms to a corresponding native term in the default language; and
   a processing device operative to automatically execute the command responsive to receiving programming instructions from a memory device that include an unidentified program term in the at least one language other than the default language by:
      searching the access table to determine whether the unidentified program term matches the respective native term stored therein,
      when the unidentified program term does not match the respective native term stored in the access table, searching the terms data structure to match the unidentified program term to a stored user-defined term;
      based on the matching, retrieving the respective native term corresponding to the user-defined term; and
      when the unidentified term is associated with the respective native term, either through the access table search or the retrieval, executing the command associated with the respective native term.

2. The apparatus of claim 1 wherein the access table and the terms database are within a data dictionary.

3. The apparatus of claim 1, the processing device further operative to:
   receive the plurality of user-defined terms each term including reference to the corresponding native term; and
   writing the user-defined term in the term database including mapping instructions to the referenced native term.

4. The apparatus of claim 1 wherein the user-defined term relates to at least one of: a transaction code and an object identifier.

5. The apparatus of claim 1, the processing device further operative to:
   prior to referencing the terms database, reference the access table; and
   search the access table using the user-defined term.

6. The apparatus of claim 1, wherein the processing device accesses the terms database using a customization call command.

7. The apparatus of claim 1, wherein the command associated with the respective native term is executed immediately after the programming instructions are received at the processing device and respective native term is identified.

8. The apparatus of claim 1, wherein the default language is English and the at least one language other than the default language is German.

9. The apparatus of claim 1, wherein the default language is a first computer programming language and the at least one language other than the default language is a second computer programming language.

10. A processing environment providing for customizing terminology therein, the processing environment including executable instructions executable on a processing device to automatically retrieve and execute a command in a default language associated with a native programming term in the default language in response to receiving programming instructions in at least one language other than the default language, the executable operations comprising:
    receiving the programming instructions that include a programming term in the at least one language other than the default language;
    searching an access table using the programming term, the access table storing native programming terms in the default language with at least one of the native terms containing a reserved word in the form of the command representing a program instruction to be executed when the command is processed by a processor;
    when the programming term is not within the access table, searching a terms database storing user-defined terms in association with the native programming terms;
    when the programming term matches one of the user-defined terms, retrieving and executing the command associated with the native programming term associated with the matching user-defined term; and
    when the programming term matches the native programming term stored in the access table, retrieving and executing the command associated with the matching native programming term.

11. The executable operations of the processing environment of claim 10 further comprising:
    prior to receiving programming instructions:
       receiving the plurality of user-defined terms, each of the user-defined terms based on one of the native terms; and
    storing the user-defined terms in the term database.

12. The executable operations of the processing environment of claim 10 further comprising:
    for each of the plurality of user-defined terms, writing a data description in the terms database.

13. The processing environment of claim 10 wherein the user-defined terms relate to at least one of: a transaction and an object.

14. The processing environment of claim 13 wherein the step of referencing the terms database includes using a customization call command.

15. The processing environment of claim 14 wherein the call command is an SPRO command.

16. A method for integrating a computer program using user-specific programming terms in at least one language other than a default language with a larger computer system having programming terms expressed in a native-format in the default language, the method comprising automatically substituting and executing a command in the default language in lieu of an user-specific programming term in the at least one language other than the default language by:
    when the computer program is to be executed, identifying a programming term to be executed;
    searching an access data structure that stores native-format programming terms in the default language where at least one native-format programming term contains a reserved word in the form of the command to be executed by a processor when the respective native-format programming term is called;

when the identified programming term does not match the native-format programming terms in the access table, searching a user-specific terms data structure storing user-defined terms in association with native programming terms to which they correspond;

when the identified programming term matches one of the user-defined terms, retrieving and executing the command associated with the native programming term corresponding to the matching user-defined term; and when the identified programming term matches a native-format programming term stored in the access table, retrieving and executing the command associated with the matching native programming term.

17. The method of claim 16, further comprising:
for each of the plurality of user-defined terms, writing a data description in the terms data structure.

18. The method of claim 17 wherein the terms data structure is in a data dictionary.

19. The method of claim 16 wherein the user-defined terms relate to at least one of: a transaction and an object.

20. The method of claim 16 wherein the step of searching the terms data structure includes using a customization call command.

21. The method of claim 20, wherein the customization call command is an SPRO command.

* * * * *